US012555916B2

(12) United States Patent
Park et al.

(10) Patent No.: US 12,555,916 B2
(45) Date of Patent: Feb. 17, 2026

(54) ANTENNA SYSTEM AND APPARATUS INCLUDING THE SAME

(71) Applicant: ELECTRONICS AND TELECOMMUNICATIONS RESEARCH INSTITUTE, Daejeon (KR)

(72) Inventors: Bong Hyuk Park, Daejeon (KR); Sunwoo Kong, Daejeon (KR); Seung Hun Wang, Daejeon (KR); Hui Dong Lee, Daejeon (KR); Seunghyun Jang, Daejeon (KR); Seok Bong Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 143 days.

(21) Appl. No.: 18/473,854

(22) Filed: Sep. 25, 2023

(65) Prior Publication Data

US 2024/0213685 A1 Jun. 27, 2024

(30) Foreign Application Priority Data

Dec. 23, 2022 (KR) ........................ 10-2022-0183564

(51) Int. Cl.
*H01Q 13/08* (2006.01)
*H01Q 1/22* (2006.01)

(52) U.S. Cl.
CPC ........... *H01Q 13/08* (2013.01); *H01Q 1/2283* (2013.01)

(58) Field of Classification Search
USPC .......................................................... 343/702
See application file for complete search history.

(56) References Cited

U.S. PATENT DOCUMENTS

| | | | | |
|---|---|---|---|---|
| 8,957,441 | B2 | 2/2015 | Jun et al. | |
| 11,258,405 | B2 | 2/2022 | Tousi et al. | |
| 12,009,574 | B2 * | 6/2024 | Franson | H01Q 3/40 |
| 2010/0134372 | A1 | 6/2010 | Ryu et al. | |
| 2014/0354499 | A1 | 12/2014 | Legay et al. | |
| 2023/0307846 | A1 * | 9/2023 | Dogiamis | H01Q 19/104 |

FOREIGN PATENT DOCUMENTS

| | | | |
|---|---|---|---|
| KR | 20170101310 | A | 9/2017 |
| KR | 102201420 | B1 | 1/2021 |
| KR | 20210122072 | A | 10/2021 |
| WO | 2022103402 | A1 | 5/2022 |

* cited by examiner

*Primary Examiner* — Crystal L Hammond
*Assistant Examiner* — Brandon Sean Woods
(74) *Attorney, Agent, or Firm* — Rabin & Berdo, P.C.

(57) ABSTRACT

An antenna system and an apparatus including the same are provided. The antenna system includes at least one antenna module, wherein the antenna module may include a plurality of antennas formed on one surface of a first board, and a beamforming chip formed on one surface of a second board, wherein the plurality of antennas is connected to the beamforming chip through a plurality of microstrip lines and a waveguide.

11 Claims, 2 Drawing Sheets

ANTENNA SYSTEM AND APPARATUS INCLUDING THE SAME

CROSS-REFERENCE TO RELATED APPLICATION

This application claims the benefit of Korean Patent Application No. 10-2022-0183564 filed on Dec. 23, 2022, in the Korean Intellectual Property Office, the entire disclosure of which is incorporated herein by reference for all purposes.

BACKGROUND

1. Field of the Invention

One or more embodiments relate to an antenna system and an apparatus including the same.

2. Description of the Related Art

Sixth-generation (6G) mobile communication may use a terahertz band. In the case of wireless communication using an ultra-high frequency band such as a terahertz band, an issue of path loss may occur.

To solve the path loss issue, multichannel-based beamforming may be used. In terahertz band-based wireless communication, antennas (e.g., planar antennas) that are much smaller in size than a beamforming chip may be used. In addition, the distance between the antennas may be very narrow. Therefore, in order to apply beamforming to terahertz band-based wireless communication, a method of connecting a beamforming chip to an antenna may be important.

The above description has been possessed or acquired by the inventor(s) in the course of conceiving the present disclosure and is not necessarily an art publicly known before the present application is filed.

SUMMARY

Embodiments provide an antenna system applicable to terahertz band-based wireless communication by connecting an antenna array to a beamforming chip using a waveguide.

However, technical goals are not limited to the foregoing goals, and there may be other technical goals.

According to an aspect, there is provided an antenna system including at least one antenna module, wherein the antenna module may include a plurality of antennas formed on one surface of a first board, and a beamforming chip formed on one surface of a second board, wherein the plurality of antennas may be connected to the beamforming chip through a plurality of microstrip lines and a waveguide.

The plurality of microstrip lines may include a first microstrip line connected to the beamforming chip and a second microstrip line connected to the plurality of antennas.

The waveguide may be configured to connect the first microstrip line and the second microstrip line.

A surface including a chip pad connected to the first microstrip line among surfaces of the beamforming chip may be connected to the one surface of the second board.

The antenna module may be formed such that at least a partial area of the first board, at least a partial area of the second board, and the waveguide overlap each other.

A normal direction of the one surface of the first board may be opposite to a normal direction of the one surface of the second board.

The beamforming chip may include a plurality of channels corresponding to a number of the plurality of antennas.

The waveguide may include a rectangular waveguide.

A length of the rectangular waveguide may be determined based on a number of the plurality of antennas and a width of each of the plurality of microstrip lines.

The plurality of antennas may include a plurality of planar antennas.

The antenna system may be used for terahertz band-based wireless communication.

According to another aspect, a communication apparatus includes the antenna system.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
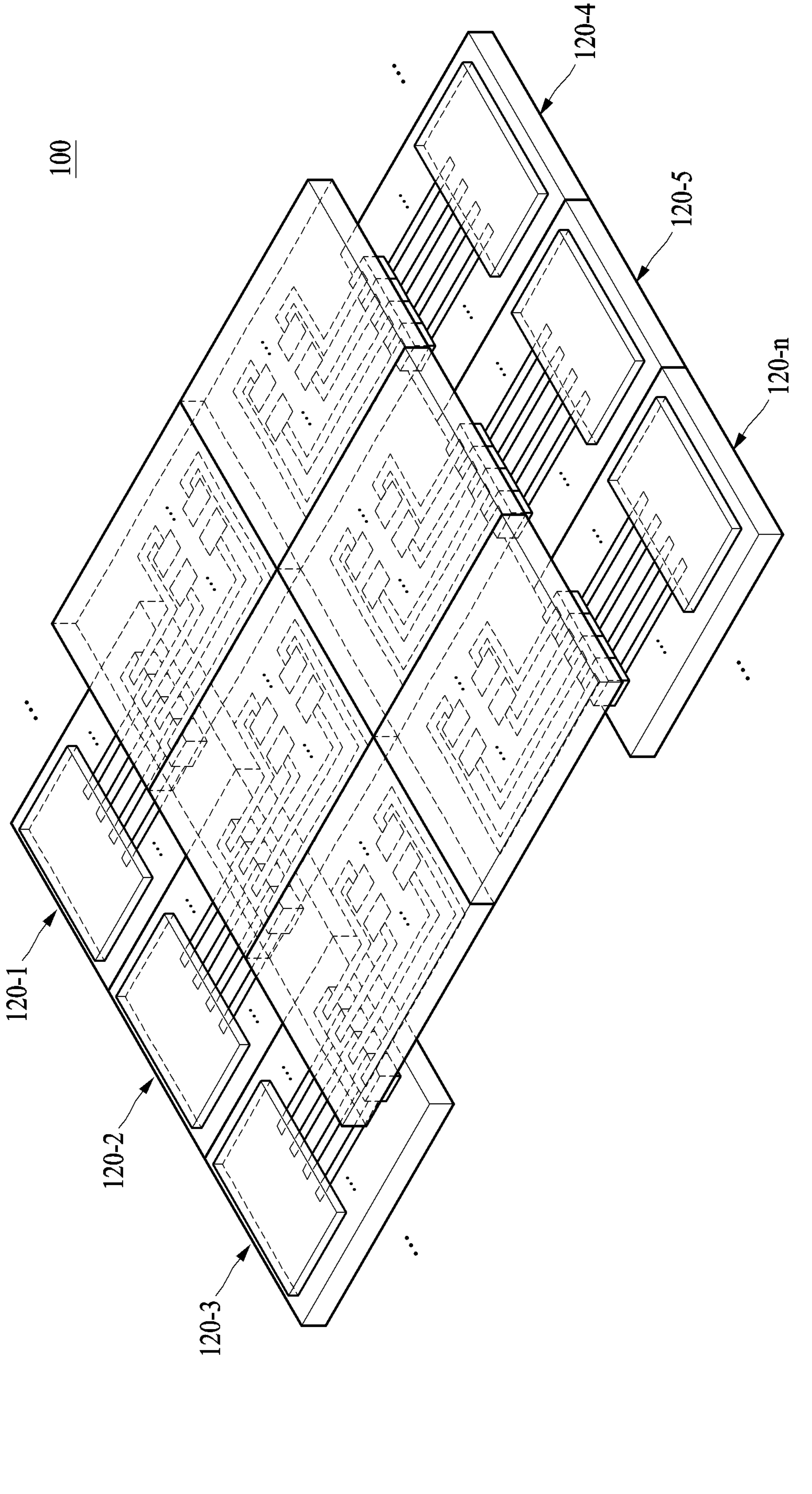
FIG. 1 is a diagram illustrating an antenna system according to an embodiment.

The following detailed structural or functional description is provided as an embodiment only and various alterations and modifications may be made to embodiments. Here, embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if it is described that one component is “connected”, “coupled”, or “joined” to another component, a third component may be “connected”, “coupled”, and “joined” between the first and second components, although the first component may be directly connected, coupled, or joined to the second component.

The singular forms “a,” “an,” and “the” are intended to include the plural forms as well, unless the context clearly indicates otherwise. As used herein, “A or B”, “at least one of A and B”, “at least one of A or B”, “A, B or C”, “at least one of A, B and C”, and “at least one of A, B, or C,” each of which may include any one of the items listed together in the corresponding one of the phrases, or all possible combinations thereof. It will be further understood that the terms “comprises/including” and/or “includes/including” when used herein, specify the presence of stated features, integers, operations, operations, elements, and/or components, but do not preclude the presence or addition of one or more other features, integers, operations, operations, elements, components and/or groups thereof.

Unless otherwise defined, all terms used herein including technical or scientific terms have the same meaning as commonly understood by one of ordinary skill in the art to which embodiments belong. Terms, such as those defined in commonly used dictionaries, should be construed to have meanings matching with contextual meanings in the relevant art and the present disclosure, and are not to be construed as an ideal or excessively formal meaning unless otherwise defined herein.

As used in this disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

The term "unit" or the like used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionality provided by the components and "units" may be combined into fewer components and "units" or further separated into additional components and "units". Furthermore, the components and "units" may be implemented to operate on one or more central processing units (CPUs) within a device or a security multimedia card. In addition, "unit" may include one or more processors.

Hereinafter, embodiments will be described in detail with reference to the accompanying drawings. When describing the embodiments with reference to the accompanying drawings, regardless of drawing numerals, like reference numerals refer to like elements and a repeated description related thereto will be omitted.

FIG. 1 is a diagram illustrating an antenna system according to an embodiment.

Referring to FIG. 1, according to an embodiment, an antenna system 100 may be used for wireless communication. For example, the antenna system 100 may be used for terahertz-based wireless communication (e.g., sixth-generation (6G) mobile communication).

The antenna system 100 may include one or more antenna modules 120-1 to 120-*n*. The antenna modules 120-1 to 120-*n* may be apparatuses for radiation of radio signals and/or beamforming of radio signals. The number of antenna modules 120-1 to 120-*n* may be determined based on requirements and/or specifications of wireless communication.

Figure 2:
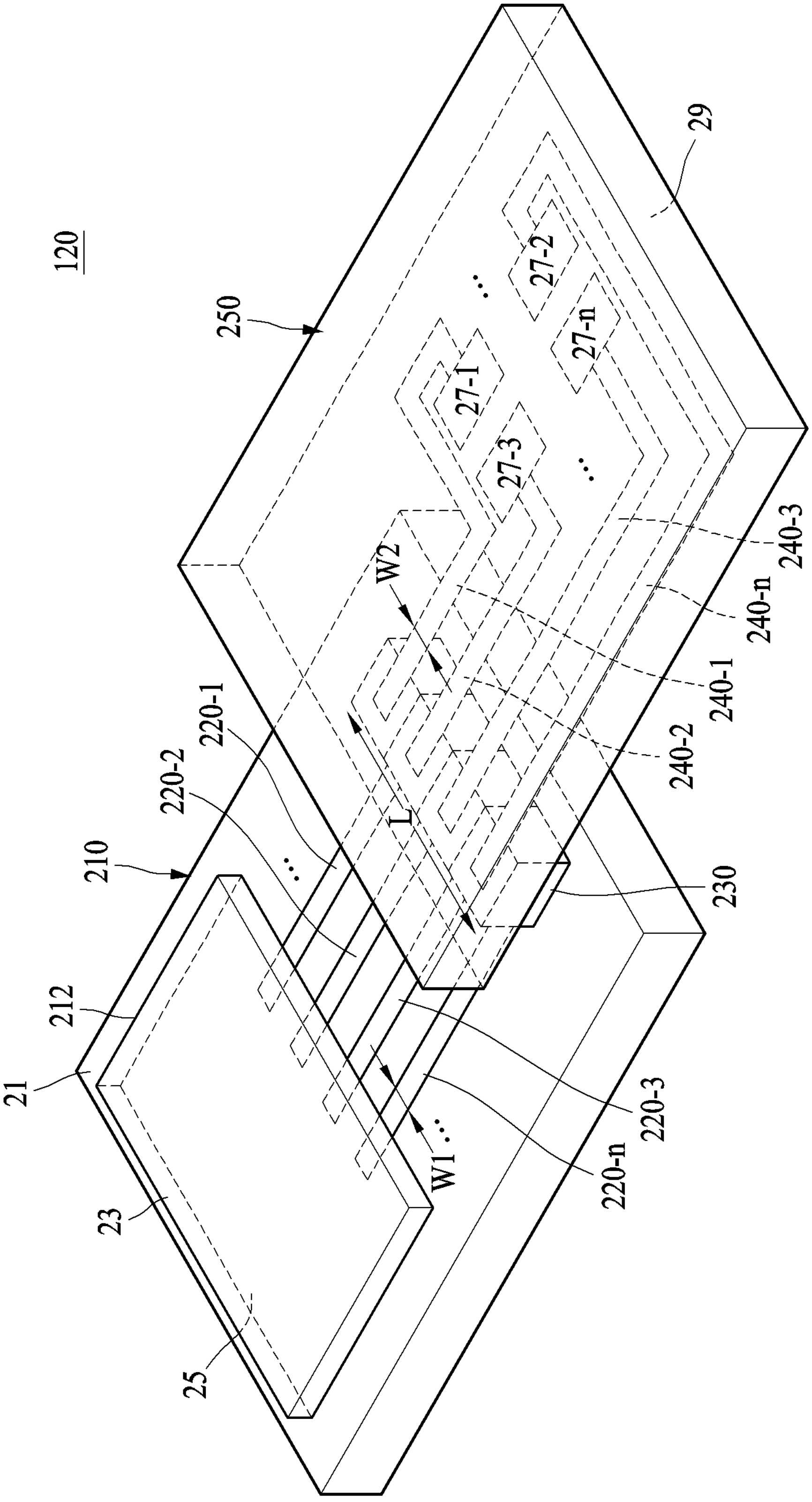
FIG. 2 is a diagram illustrating an antenna module according to an embodiment.

FIG. 2 is a diagram illustrating an antenna module according to an embodiment.

Referring to FIG. 2, according to an embodiment, an antenna module 120 may include a beamforming chip 212 and a plurality of antennas 27-1 to 27-*n* (e.g., a plurality of planar antennas).

The beamforming chip 212 may be an element for beamforming of radio signals radiated from the plurality of antennas 27-1 to 27-*n*. The beamforming chip 212 may include one or more channels, and the beamforming chip 212 may adjust a phase and/or gain of a radio signal corresponding to each of the channels. Radio signals (e.g., radio signals with a center frequency of 100 gigahertz (GHz) or more) output from the respective channels of the beamforming chip 212 may be transmitted through first microstrip lines 220-1 to 220-*n*. The number of channels of the beamforming chip 212 may correspond to the number of antennas 27-1 to 27-*n*.

The beamforming chip 212 may be formed on one surface 21 of a first board 210. A surface (e.g., an upper surface 25) including a chip pad (not shown) among a plurality of surfaces (e.g., a lower surface 23 and the upper surface 25) of the beamforming chip 212 may be connected to the one surface 21 of the first board 210.

The beamforming chip 212 may be connected to the first microstrip lines 220-1 to 220-*n* through the chip pad (not shown). The number of first microstrip lines 220-1 to 220-*n* may correspond to the number of channels of the beamforming chip 212. For example, the number of first microstrip lines 220-1 to 220-*n* may be equal to the number of channels of the beamforming chip 212.

An antenna array including the plurality of antennas 27-1 to 27-*n* (e.g., aperture-coupled antennas) may be an element for radiating radio signals. The antennas 27-1 to 27-*n* may be formed on one surface 29 of a second board 250, and the antennas 27-1 to 27-*n* may be connected to second microstrip lines 240-1 to 240-*n*, respectively.

The normal direction of the second board 250 may be opposite to the normal direction of the first board 210. For example, an angle formed between the normal direction of the second board 250 and the normal direction of the first board 210 may be 180 degrees. The number of second microstrip lines 240-1 to 240-*n* and/or the number of antennas 27-1 to 27-*n* may correspond to the number of channels of the beamforming chip 212.

A waveguide 230 (e.g., a rectangular waveguide) may be an element for connecting the first microstrip lines 220-1 to 220-*n* to the second microstrip lines 240-1 to 240-*n*. For example, the waveguide 230 may be directly connected to the first microstrip lines 220-1 to 220-*n* and/or the second microstrip lines 240-1 to 240-*n*. In another example, the waveguide 230 may be indirectly connected to the first microstrip lines 220-1 to 220-*n* and/or the second microstrip lines 240-1 to 240-*n*. That is, the waveguide 230 may function as a connecting element to transmit radio signals from the first microstrip lines 220-1 to 220-*n* to the second microstrip lines 240-1 to 240-*n*. Radio signals output from the beamforming chip 212 may be transmitted from the first microstrip lines 220-1 to 220-*n* to the waveguide 230 through a microstrip-to-waveguide transition. The radio signals transmitted to the waveguide 230 may be transmitted to the second microstrip lines 240-1 to 240-*n* through a waveguide-to-microstrip transition. The radio signals transmitted to the second microstrip lines 240-1 to 240-*n* may be radiated through the plurality of antennas 27-1 to 27-*n*.

A length L of the waveguide 230 may be determined based on the number of antennas 27-1 to 27-*n*, a width W1 of the first microstrip lines 220-1 to 220-*n* and/or a width W2 of the second microstrip lines 240-1 to 240-*n*. The width W1 of the first microstrip lines 220-1 to 220-*n* and the width W2 of the second microstrip lines 240-1 to 240-*n* may be equal to or different from each other.

When the waveguide 230 includes a plurality of waveguides (not shown), the number of waveguides (not shown) may correspond to the number of antennas 27-1 to 27-*n*, and a length of each of the waveguides (not shown) may be determined based on the width W1 of the first microstrip lines 220-1 to 220-*n* and/or the width W2 of the second microstrip lines 240-1 to 240-*n*.

The waveguide 230, at least a partial area of the first board 210, and at least a partial area of the second board 250 may overlap each other.

According to an embodiment, an antenna system (e.g., the antenna system 100 of FIG. 1) may be applied to terahertz-based wireless communication by transmitting radio signals from the beamforming chip 212 to the plurality of antennas 27-1 to 27-*n* through the first microstrip lines 220-1 to 220-*n*, the second microstrip lines 240-1 to 240-*n*, and the waveguide 230.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The above-described hardware devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents to the claims are also within the scope of the following claims.

What is claimed is:

1. An antenna system comprising:
an antenna module,
wherein the antenna module comprises:
a plurality of antennas formed on one surface of a first board; and
a beamforming chip formed on one surface of a second board,
wherein the plurality of antennas is connected to the beamforming chip through a plurality of microstrip lines and a waveguide,
wherein at least a first partial area of the first board overlaps the waveguide at a first surface of the waveguide, and at least a first partial area of the second board overlaps the waveguide at a second surface of the waveguide opposite to the first surface of the waveguide.

2. The antenna system of claim 1, wherein
the plurality of microstrip lines comprises:
a first microstrip line connected to the beamforming chip; and
a second microstrip line connected to the plurality of antennas.

3. The antenna system of claim 2, wherein
the waveguide is configured to connect the first microstrip line and the second microstrip line.

4. The antenna system of claim 2, wherein
a surface comprising a chip pad connected to the first microstrip line among surfaces of the beamforming chip is connected to the one surface of the second board.

5. The antenna system of claim 1, wherein
a normal direction of the one surface of the first board is opposite to a normal direction of the one surface of the second board,
a second partial area of the first board extends beyond a region where the first partial area of the first board overlaps the waveguide,
a second partial area of the second board extends beyond a region where the first partial area of the second board overlaps the waveguide,
the second partial area of the first board is greater than the first partial area of the first board, and
the second partial area of the second board is greater than the second partial area of the second board.

6. The antenna system of claim 5, wherein
the beamforming chip comprises a plurality of channels corresponding to a number of the plurality of antennas,
the first microstrip line extends across the one surface of the first board from the second partial area of the first board to the first partial area of the first board to connect to the waveguide, and
the second microstrip line extends across the one surface of the second board from the first partial area of the second board to the second partial area of the second board to connect to the plurality of antennas.

7. The antenna system of claim 1, wherein
the waveguide comprises a rectangular waveguide.

8. The antenna system of claim 7, wherein
a length of the rectangular waveguide is determined based on a number of the plurality of antennas and a width of each of the plurality of microstrip lines.

9. The antenna system of claim 1, wherein
the plurality of antennas comprises a plurality of planar antennas.

10. The antenna system of claim 1, wherein
the antenna system is for terahertz band-based wireless communication.

11. A communication apparatus comprising
the antenna system of claim 1.

* * * * *